United States Patent [19]

Watanabe et al.

[11] 4,354,564
[45] Oct. 19, 1982

[54] CULTIVATOR HAVING A VERTICALLY OPERATED ENGINE

[75] Inventors: Yoshimi Watanabe, Wako; Gunji Saito, Tokyo; Masaharu Omagari, Niiza; Kenji Nakamura, Wako, all of Japan

[73] Assignee: Honda Giken Kogyo Kabushiki Kaisha, Tokyo, Japan

[21] Appl. No.: 174,599

[22] Filed: Aug. 1, 1980

[30] Foreign Application Priority Data

| Aug. 2, 1979 [JP] | Japan | 54-106142 |
| Aug. 9, 1979 [JP] | Japan | 54-108935 |
| Aug. 9, 1979 [JP] | Japan | 54-108936 |
| Aug. 9, 1979 [JP] | Japan | 54-108937 |

[51] Int. Cl.³ .......................................... B62D 51/06
[52] U.S. Cl. ................................. 180/19 H; 74/768; 74/785; 172/103; 172/125; 180/19 R; 180/292
[58] Field of Search ............ 180/291, 292, 293, 54 F, 180/19 R, 19 S, 19 H; 172/42, 43, 125, 103; 74/785, 783, 768, 769; 72/785, 768, 769, 783

[56] References Cited

U.S. PATENT DOCUMENTS

| 641,097 | 1/1900 | Gerard | 74/768 |
| 2,314,664 | 3/1943 | Shenstone | 74/785 |
| 3,123,149 | 3/1964 | White | 180/19 R |

Primary Examiner—Joseph F. Peters, Jr.
Assistant Examiner—M. J. Hill
Attorney, Agent, or Firm—Armstrong, Nikaido, Marmelstein & Kubovcik

[57] ABSTRACT

A vertical engine type cultivator of the type that has an internal combustion engine on an upper side, a wheel shaft on a lower side and an operational handle on a rear side. The engine is formed such that the engine main body thereof is provided with a vertically directional crankshaft extending downwards through an oil case. A frame casing on the lower side of the oil case and a clutch mechanism interposed between the crankshaft and an output shaft disposed below the crankshaft is contained in the frame casing. An operational member for the clutch mechanism is provided on the oil case side.

8 Claims, 9 Drawing Figures

CULTIVATOR HAVING A VERTICALLY OPERATED ENGINE

BACKGROUND OF THE INVENTION

The invention relates to a vertical engine type cultivator which is principally suitable for domestic use.

As for a cultivator of this kind, there has been hitherto known a type where the same comprises an internal combustion engine on an upper side, a wheel shaft on a lower side and an operation handle on a rear side. There is a requirement for this type where the engine and a clutch mechanism on an output side thereof are to be contained in a comparatively small space so that the whole of the cultivator may be smaller in size.

SUMMARY OF THE INVENTION

The present invention has for its object to provide a cultivator meeting the above requirement, and in a cultivator of the type that the same comprises an internal combustion engine on an upper side, a wheel shaft on a lower side and an operation handle on a rear side, whereby the engine is formed into a vertical type, where an engine main body thereof is provided with a vertically directional crankshaft extending downward through an oil case thereof. There is provided a frame casing on the lower side of the oil case and a clutch mechanism interposed between the crankshaft. An output shaft provided below the crankshaft is contained in the frame casing, and an operational member for the clutch mechanism is provided on the oil case side.

Furthermore, in this type of cultivator, the clutch mechanism is made comparatively small in size and also serves as a reduction gear.

The invention has for its other object to provide a cultivator whereby the clutch mechanism comprises a sun gear provided on the crankshaft, at least one star gear is provided on the periphery of the sun gear and in mesh therewith, and an internal gear provided on the periphery of the star gear is meshed therewith. The internal gear is so arranged as to be braked by a brake member arranged to be moved by the operation member.

Furthermore, there is provided an arrangement for taking out an output of the clutch mechanism which is comparatively small in size.

The invention has for its other object to provide a cultivator having a supporting plate for pivotally supporting the star gear in the frame casing, and is rotatably mounted at its central tubular shaft in a shaft opening formed below the same, and the tubular shaft is connected to the output shaft extending downward.

Furthermore, in this type of cultivator, it is desirable to have the clutch mechanism of such a type that an output thereof can be changed over between a high speed and a low speed.

The invention has for its other object to provide a cultivator satisfying this desire, whereby the clutch mechanism comprises a sun gear on the crankshaft, at least one pair of upper and lower coaxial star gears provided on the periphery of the sun gear in such a condition that one of them is meshed therewith, and a pair of inner and outer coaxial internal gears provided on the peripheries of the star gears and meshed therewith respectively. These internal gears are so arranged as to be selectively braked by a brake member such as a brake shoe or the like, arranged to be moved with the operation member.

The invention will be better understood with reference to the accompanying drawings in which:

DESCRIPTION OF THE INVENTION

Figure 1:
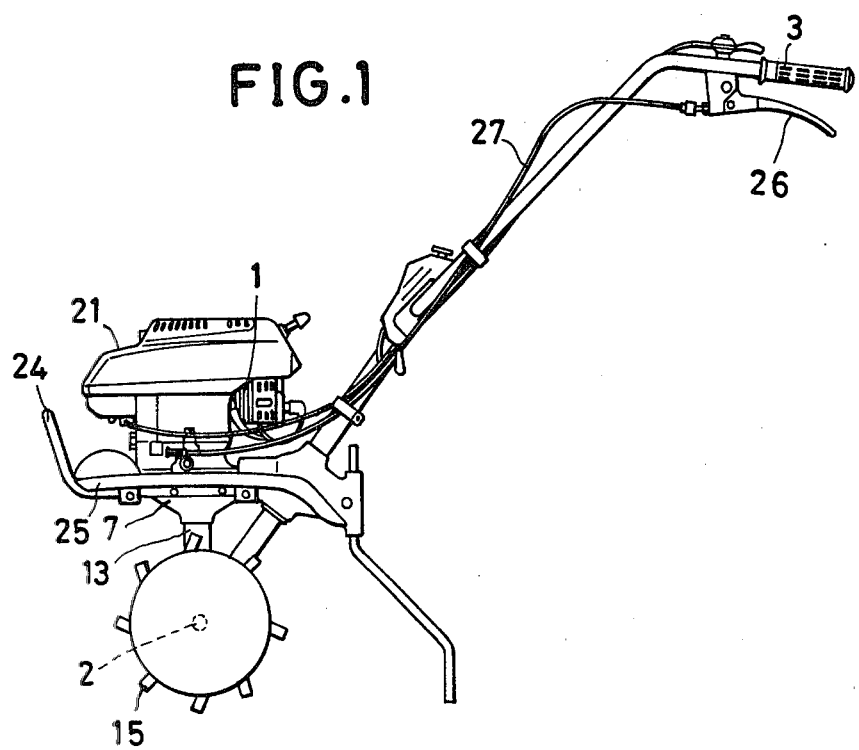
FIG. 1 is a side view of one exemplified cultivator of this invention.
Figure 2:
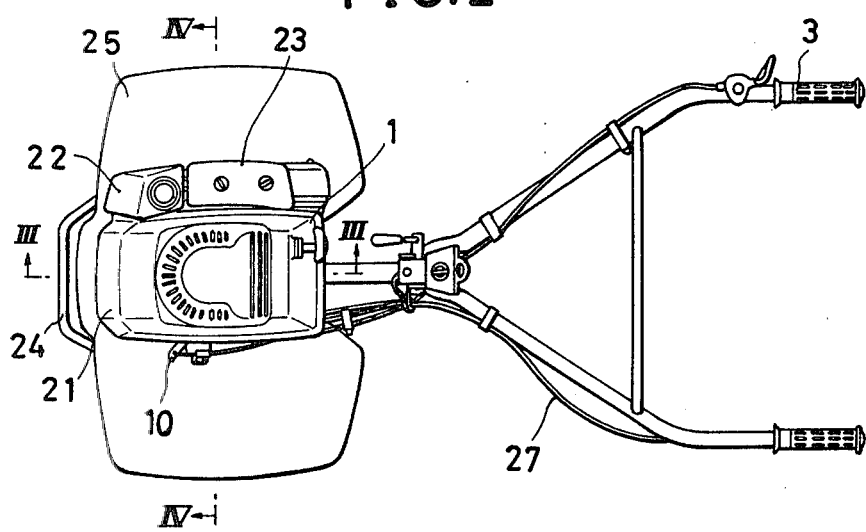
FIG. 2 is a top plan view of the same.

The invention will be explained with reference to the accompanying drawings in which numeral 1 denotes an internal combustion engine on an upper side, having a wheel shaft 2 on a lower side, and an operational handle 3 on the rear side. These in general constitute a cultivator as shown clearly in FIGS. 1 and 2.

As is shown clearly in FIGS. 3 and 4, the engine 1 is formed into such a vertical type, that an engine main body 4 is provided with a vertical directional crankshaft 6 extending downward through an oil case 5, and a frame casing 7 is provided on the lower side of the oil case 5, and a clutch mechanism 9 interposed between the crankshaft 6 and an output shaft 8 provided below the crankshaft 6 is contained in the frame casing 7. An operation member 10 for operating the clutch mechanism 9 is provided on the oil case 5 side.

The frame casing 7 is put on the lower surface of the oil case 5 and is detachably secured thereto by means of bolts 11 so that assembling and disassembling of the clutch mechanism 9 may be facilitated.

The output shaft 8 extends downward and is connected through a bevel gear mechanism 12 to the foregoing wheel shaft 2 extending substantially horizontally below the output shaft 8 so that the shaft 2 may be rotated there through by the output shaft 8.

Referring to the drawings, numeral 13 denotes a tubular portion extending downward from the frame casing 7, and numeral 14 denotes a machine housing attached to the lower end thereof. The bevel gear mechanism 12 is contained in the housing 14 and the wheel shaft 2 is passed through the same to extend to both outsides thereof. A rotary cultivating member 15 is mounted on the wheel shaft 2.

The foregoing engine main body 4 has a cylinder 16, extending horizontally rearwardly, a piston 17 mounted therein and a shaft 18 extending upwards. A cooling fan 19 and a starter pulley 20 are mounted on the shaft 18, and a fan cover 21 is provided on the upper side thereof. Numeral 22 denotes a fuel tank and numeral 23 denotes an air cleaner casing.

The foregoing operation handle 3 is secured to the frame casing 7 and the machine housing 14. The frame casing 7 is provided with a guard pipe 24 projecting forwards and a fender 25 projecting laterally. The operation handle 3 is provided with a clutch actuation member 26 such as a clutch lever or the like near the top end portion thereof, and this member 26 is connected to the operation member 10 through a clutch wire 27.

The operation of the foregoing arrangement will be explained as follows:

If the engine 1 is operated, rotation of the crankshaft 6 can be taken out at the output shaft 8 through the clutch mechanism 9 contained in the frame casing 7, and thereby the wheel shaft 2 below the output shaft 8 can be rotated.

Thus, according to the invention, the frame casing 7 is disposed below the oil case 5 of the engine main body 4 and the clutch mechanism 9 is contained in the frame casing 7, so that the whole of the arrangement is of a comparatively small-size due to utilization of the space below the oil case 5.

Figure 5:
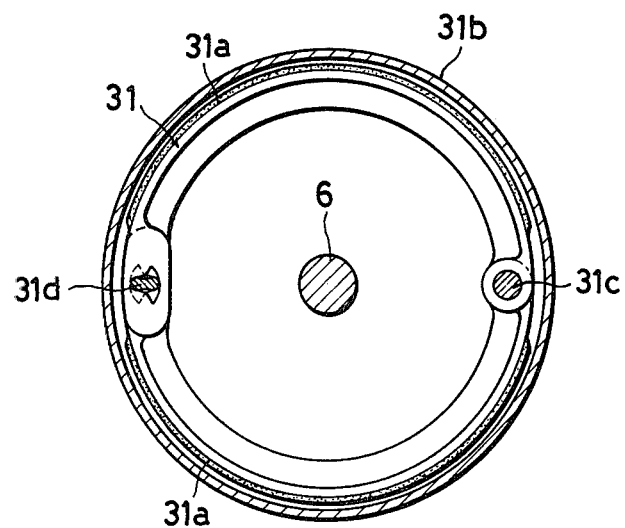
FIG. 5 is a sectional view taken along lines V—V in FIG. 4.
Figure 6:
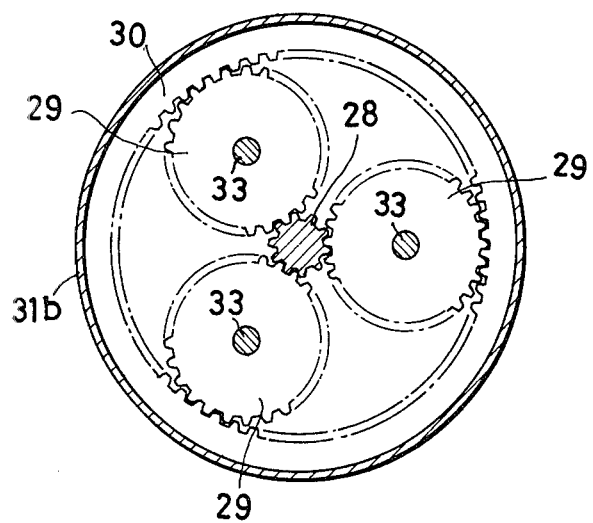
FIG. 6 is a sectional view taken along lines VI—VI in FIG. 4.

The clutch mechanism 9 is constructed into a differential gear type to also act as a reduction gear. As shown clearly in FIGS. 5 and 6, the clutch mechanism 9 comprises a sun gear 28 formed on the crankshaft 6, at least one star gear 29 provided on the periphery of the gear 28 and meshed therewith, and an internal gear 30 provided on the periphery of the star gear 29 and meshed therewith. The internal gear 30 is so arranged as to be braked by a brake member 31 such as a brake shoe or the like, arranged to be moved with the operation member 10.

In the illustrated example, the gear 28 is formed directly on the lower end portion of the crankshaft 6, and three star gears 29, 29, 29 are disposed around the same. These gears 29, 29, 29 are pivotally supported on a supporting plate 32 disposed below them at their respective central pivots 33, 33, 33 and also the same are so connected through the supporting plate 32 to the output shaft 8 as described more in detail hereinafter.

The brake member 31 comprises a pair of right and left brake shoes 31a, 31a, and these shoes 31a, 31a extend along the inner periphery of a brake drum 31b formed integrally with the internal gear 30, so that if the operation member 10 is actuated; the shoes 31a, 31a are opened one another outwardly to be brought into pressure contact with the drum 31b for braking the internal gear 30. Furthermore, the shoes 31a, 31a are pivotally supported at their one end portions by a pivot 31c and are provided with a brake cam 31d interposed between the other end portions thereof.

The operation of the foregoing arrangement will be explained as follows:

When the brake member 31 is inoperative and accordingly the internal gear 30 is kept free to be rotated, rotation of the crankshaft 6 serves only to rotate the internal gear 30 through the sun gear 28 and the star gear 29, and no rotation can be obtained at the output shaft 8, and thus the clutch mechanism 9 is in its OFF condition. If, now, the brake member 31 is made operative and thereby the internal gear 30 is braked, rotation of the crankshaft 6 causes the star gear 29 to rotate about its own axis and at the same time rotate about the sun gear 29 along the inner surface of the internal gear 30 and thus the rotation thereof along the inner surface of the gear 30 can be obtained through the plate 32 at the output shaft 8. Thus, the clutch mechanism 9 is in its ON condition and a reduction speed operation is obtained.

Thus, according to this arrangement, such an ON or OFF condition of the clutch mechanism can be obtained only by control of the brake member and at the same time a reduction speed operation can be obtained in the ON condition thereof. The whole of the arrangement can be made smaller in size and lighter in weight by having the clutch mechanism in the frame casing 7.

The foregoing supporting plate 32 is rotatably mounted at its central tubular shaft 34 in a shaft opening 35 provided below the supporting plate 32, and the tubular shaft 34 is connected by a spline engagement or the like to the foregoing output shaft 8 extending downward.

Figure 3:
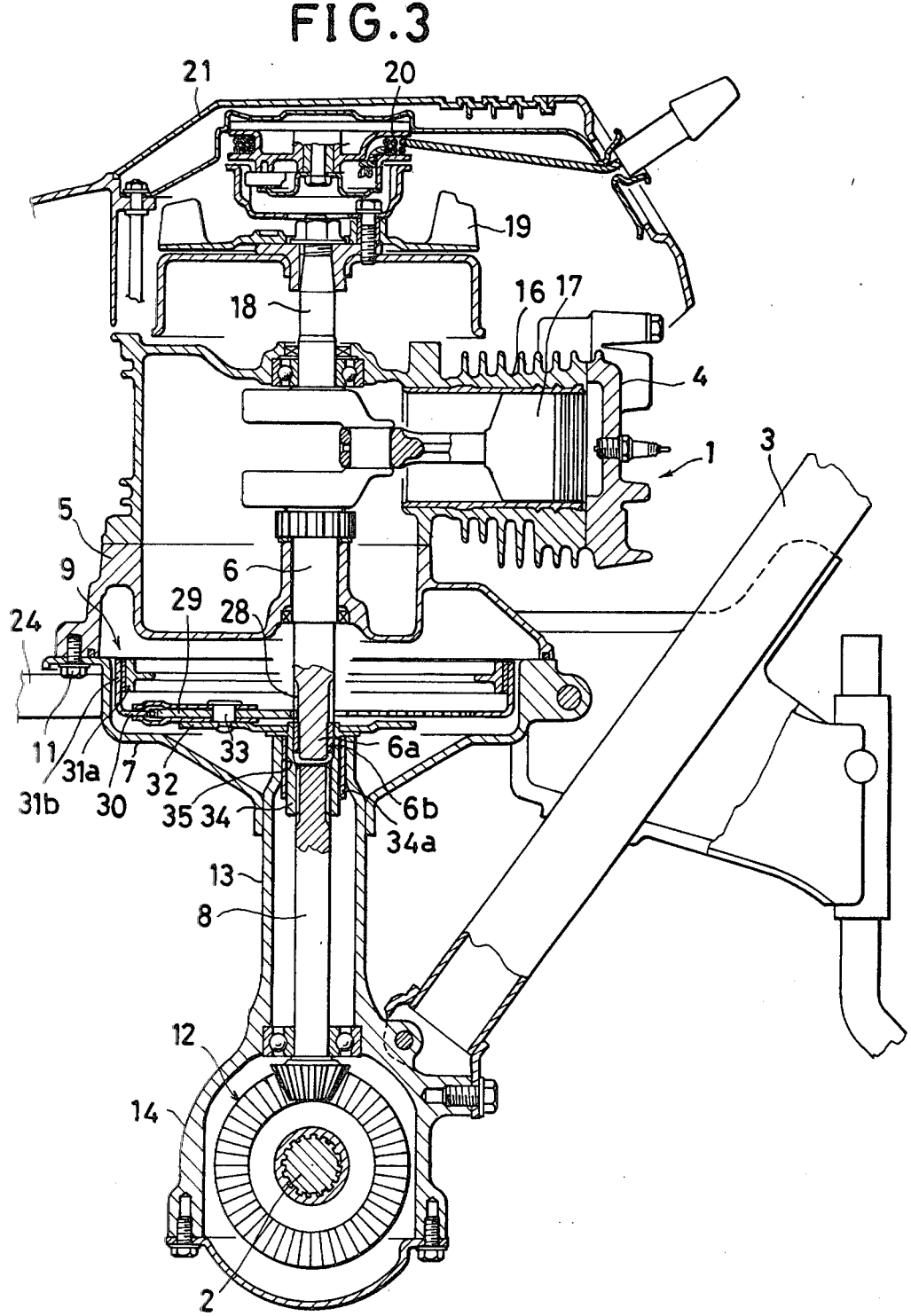
FIG. 3 is an enlarged sectional view of an important section thereof, taken along the lines III—III in FIG. 2.
Figure 4:
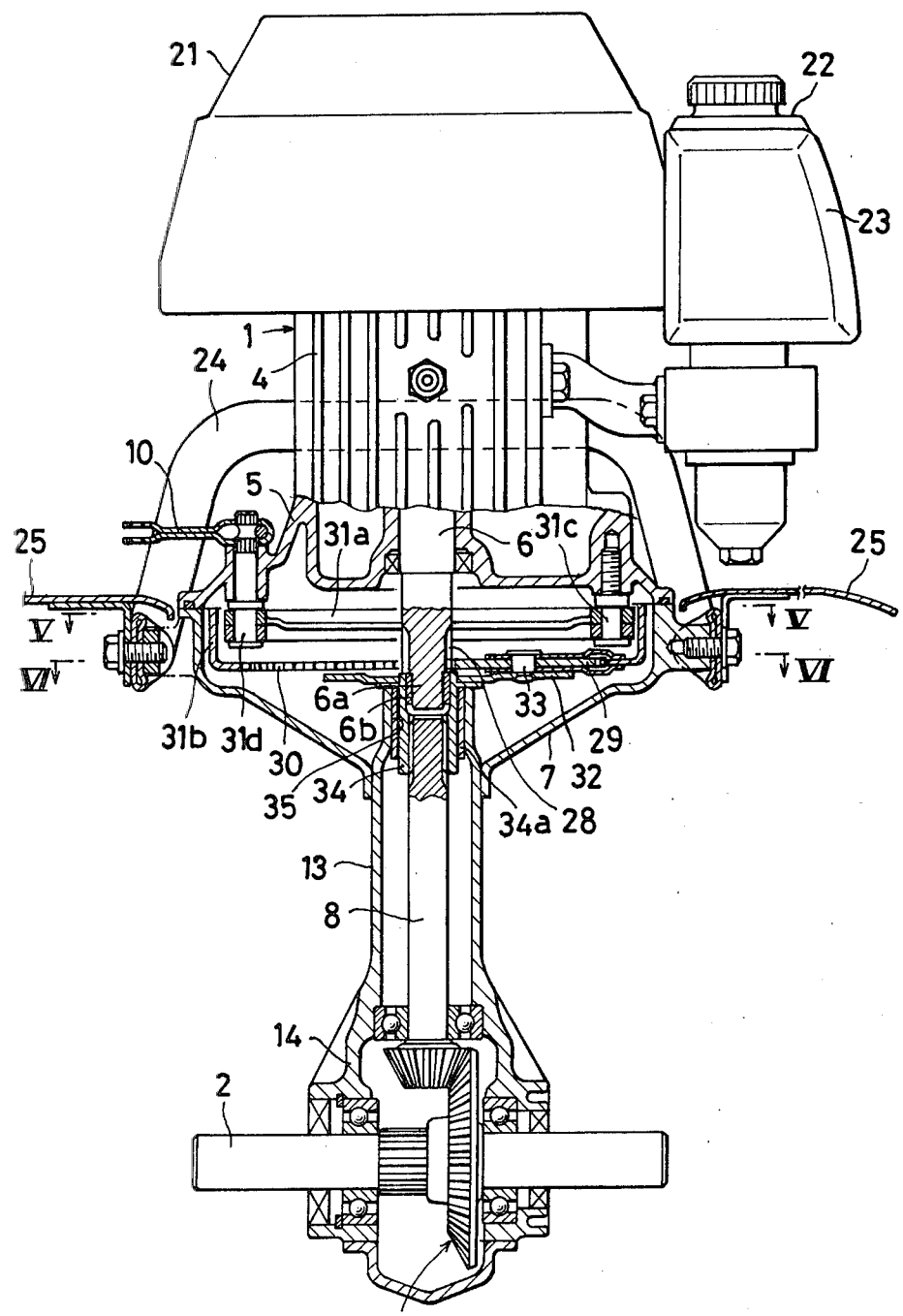
FIG. 4 is an enlarged sectional view of an important section thereof, taken along the lines IV—IV in FIG. 2.

In the illustrated embodiment, as shown clearly in FIGS. 3 and 4, the crankshaft 6 is provided at its lower end portion with a smaller diameter portion 6a extending integrally therefrom, and the portion 6a is rotatably mounted in the foregoing tubular shaft 34 through a surrounding bush member 6b, so that the crankshaft 6 and the output shaft 8 can be held in alignment one with another.

The tubular shaft 34 is mounted in a tubular wall defining the shaft opening 35 through a surrounding bush member 34a, and the lower portion of the shaft opening 35 is so extended downward as to form the foregoing tubular portion 13 surrounding the output shaft 8.

With this arrangement, the output of the clutch mechanism 9, that is, rotation of the star gear 29 can be had through the tubular shaft 34 to the output shaft 8, so that the connection between the clutch mechanism 9 and the output shaft 8 can be simplified and reduced in size.

Figure 7:
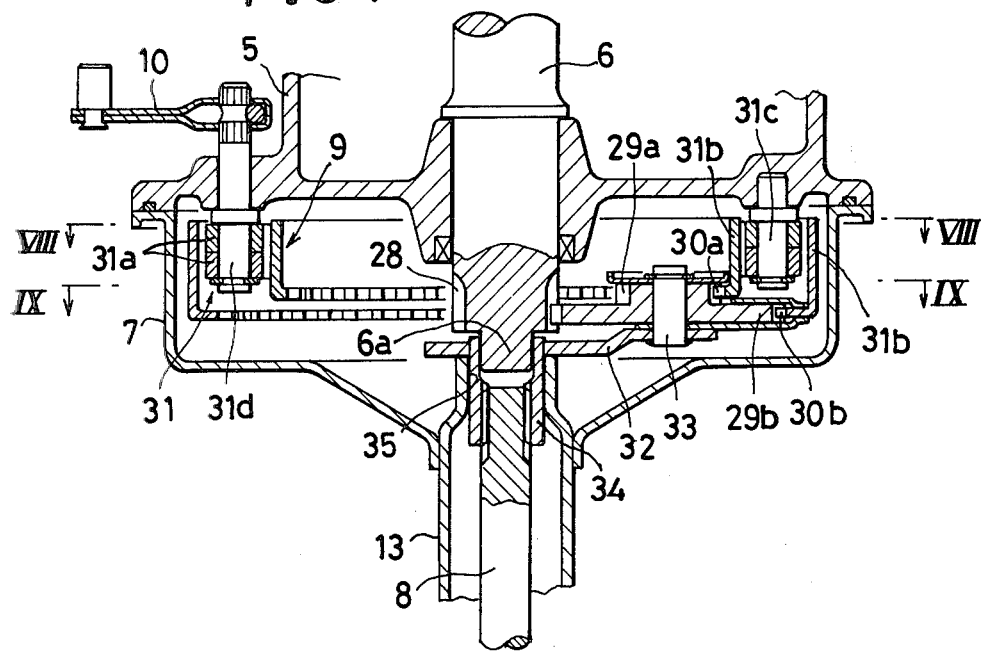
FIG. 7 is a sectional side view of a clutch mechanism section of a modified example thereof.
Figure 8:
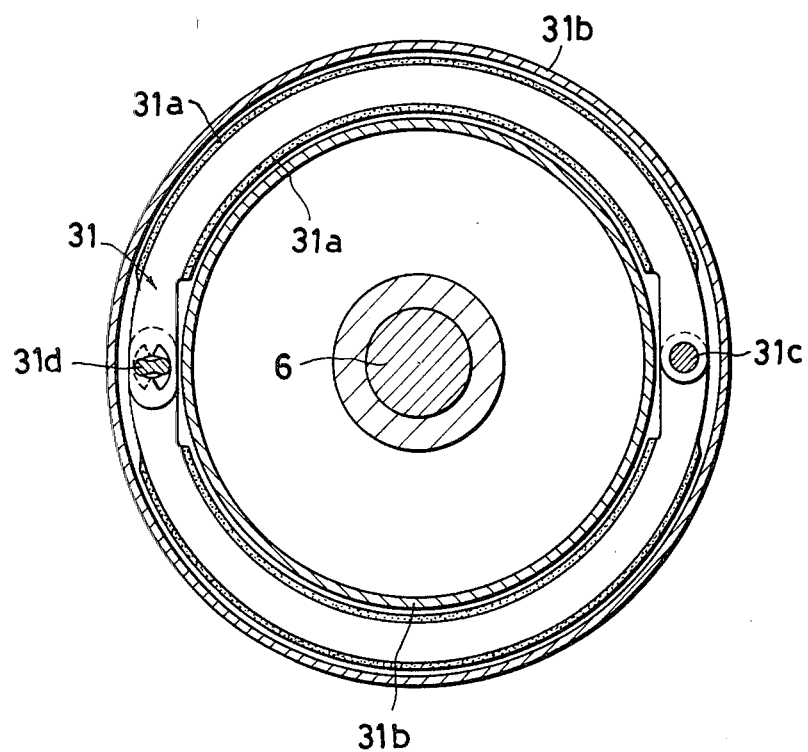
FIG. 8 is a sectional view taken along the lines VIII—VIII in FIG. 7.
Figure 9:
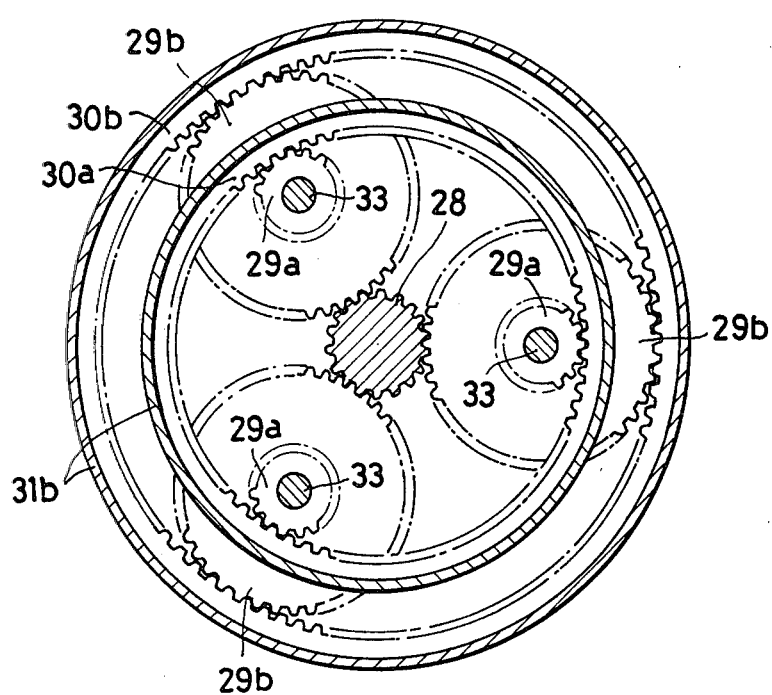
FIG. 9 is a sectional view taken along the lines IX—IX in FIG. 7.

The foregoing clutch mechanism 9 can be modified into one, for instance, as shown in FIGS. 7 to 9. Namely, the same comprises a sun gear 28 formed on the crankshaft 6, at least one pair of upper and lower coaxial star gears 29a, 29b are provided on the periphery of the gear 28 in such a condition that one (29b) of the two is meshed therewith, and a pair of inner and outer coaxial internal gears 30a, 30b provided on the peripheries of the two star gears 29a, 29b and meshed therewith respectively. The inner and outer internal gears 30a, 30b are so arranged as to be selectively braked by a brake member 31 arranged to be moved with the foregoing operation member 10.

In the illustrated example, the two star gears 29a, 29b are joined together as one unit, and three units thereof are pivotally supported at their respective center pivots 33, 33, 33 on a supporting plate 32 in almost the same manner as in the foregoing example. The brake member 31 comprises a pair of right and left brake shoes 31a, 31a extending along an annular gap formed between two inner and outer brake drums 31b, 31b formed integrally with the two internal gears 30a, 30b and the two shoes 31a, 31a are pivotally supported at one end portions by a pivot 31c and are provided with a brake cam 31d interposed between the outer end portions thereof. Consequently, if the brake cam 31d is turned in one direction, the shoes 31a, 31a are so opened one to another, as to be brought into pressure contact with the outer brake drum 31b and to brake the outer internal gear 30b.

On the other hand, if the brake cam 31d is turned in the other direction, the shoes 31a, 31a are closed to one another and the inner internal gear 30b is braked.

The operation of the foregoing arrangement will be explained as follows:

Where the brake member 31 is in its neutral position and the two internal gears 30a, 30b are not braked, rotation of the gear 28 made by rotation of the crankshaft 6 serves only to rotate the two internal gears 30a, 30b through the star gears 29a, 29b, and no rotation can be obtained at the output shaft 8. If, then, one or the other of the two internal gears 30a, 30b is selectively braked, rotation at a high speed and rotation at a low speed can be obtained at the output shaft 8. Namely, if the internal gear 30a is braked, the star gear 29a rotates about its own axis and at the same time is rotated about the gear 28 along the inner surface of the internal gear 30a. If the internal gear 30b is braked, the star gear 29b is rotated about its own axis and at the same time is rotated along the inner surface of the internal gear 30b and thus the rotation of the respective star gears 29a, 29b about the gear 28 can be taken out at the output shaft 8 at a high speed and at a low speed, respectively.

BEST MODE OF INVENTION

The vertical engine type cultivator comprises an internal combustion engine 1 on an upper side, a wheel shaft 2 on a lower side and an operation handle 3 on a rear side. The engine is formed into such a vertical type that its engine main body thereof 4 is provided with a vertically directional crankshaft 6 extending downward through an oil case 5 thereof. Furthermore, there is provided a frame casing 7 on the lower side of the oil case 5 and a clutch mechanism 9 interposed between the crankshaft 6 and an output shaft 8 disposed below the crankshaft 6 which is contained in the frame casing 7. An operation member 10 for the clutch mechanism 9 is provided on the oil case 5 side.

Thus, according to this arrangement, not only the clutch mechanism can be changed over between its ON and OFF conditions but also an output thereof can be changed over between a high speed and a low speed, so that the same can be used advantageously. Furthermore, the same is easy to operate because it requires only the operation of the brake member. In addition, the same is simple in construction and low in manufacturing costs because it requires only at least one pair of star gears and one pair of internal gears provided outside the periphery of the sun gear.

Many modifications and variations of the present invention are possible in light of the above teachings. It is, therefore, to be understood that within the scope of the appended claims, the invention may be practiced otherwise than as particularly described.

What is claimed is:

1. A cultivator of the type employing a vertical engine that comprises an internal combustion engine on its upper side, a wheel shaft on a lower side and an operation handle on a rear side, wherein: the engine is defined by an engine main body provided with a vertically directional crankshaft extending downwards through an oil case thereof, a frame casing on the lower side of the oil case, a clutch mechanism interposed between the crankshaft and an output shaft disposed below the crankshaft contained in the frame casing, and an operational member for the clutch mechanism provided on the oil case side the clutch mechanism comprising a sun gear provided on the crankshaft, at least one star gear provided on the periphery of the sun gear and in mesh therewith, an internal gear provided on the periphery of the star gear and in mesh therewith, and the internal gear being so arranged as to be braked by a brake member, said brake member being arranged to be moved by the operational member.

2. A cultivator as claimed in claim 1 further comprising a bevel gear mechanism interconnecting said output shaft to said wheel shaft extending substantially horizontally below the output shaft.

3. A cultivator as claimed in claim 1, further comprising a supporting plate for pivotally supporting the star gear in the frame casing rotatably mounted on a central tubular shaft in a shaft opening formed below the same, said frame casing being connected to the output shaft extending downwardly.

4. A cultivator of the type employing a vertical engine that comprises an internal combustion engine on its upper side, a wheel shaft on a lower side and an operation handle on a rear side, wherein: the engine is defined by an engine main body provided with a vertically directional crankshaft extending downwards through an oil case thereof, a frame casing on the lower side of the oil case, a clutch mechanism interposed between the crankshaft and an output shaft disposed below the crankshaft contained in the frame casing, and an operational member for the clutch mechanism is provided on the oil case side, the clutch mechanism comprises a sun gear provided on the crankshaft, at least one pair of integrally connected upper and lower coaxial star gears provided on the periphery of the sun gear, one of said star gears being in mesh with the sun gear, and a pair of inner and outer coaxial internal gears provided on the peripheries of the star gears and meshed therewith, respectively, said internal gears being so arranged as to be selectively braked by at least one brake shoe arranged to be moved by the operational member.

5. A cultivator as claimed in claim 1, wherein said internal gear includes an outer circumferential upstanding flange portion, said brake member including a pair of right and left brake shoes extending along the inner periphery of said flange portion for engagement therewith.

6. A cultivator as claimed in claim 4, said clutch further including a second brake shoe and, wherein each internal gear includes an outer circumferential upstanding flange portion, the pair of brake shoes being positioned in the annular space formed between the two flange portions for selective radial movement to engage the desired internal gear.

7. A cultivator as claimed in claim 5, wherein said brake member further comprises a pivot mounting for one end of each of said brake shoes, and said operational member includes a brake cam positioned for movement in a camming slot provided in the other end of each of brake shoes.

8. A cultivator as claimed in claim 6, wherein said clutch further comprises a pivot mounting for one end of each of said brake shoes, and said operational member includes a brake cam positioned for movement in a camming slot provided in the other end of each of brake shoes.

* * * * *